United States Patent
Fan et al.

(10) Patent No.: US 9,829,098 B2
(45) Date of Patent: Nov. 28, 2017

(54) MANUAL CONTROL OF SPEED-RATIO SELECTION IN AN AUTOMATIC TRANSMISSION

(71) Applicant: GM GLOBAL TECHNOLOGY OPERATIONS LLC, Detroit, MI (US)

(72) Inventors: Yue Fan, Ann Arbor, MI (US); John C. Lyons, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 615 days.

(21) Appl. No.: 14/535,519

(22) Filed: Nov. 7, 2014

(65) Prior Publication Data

US 2016/0131250 A1    May 12, 2016

(51) Int. Cl.
| | |
|---|---|
| *F16H 61/16* | (2006.01) |
| *F16H 61/02* | (2006.01) |
| F16H 59/36 | (2006.01) |
| F16H 59/02 | (2006.01) |

(52) U.S. Cl.
CPC ......... *F16H 61/16* (2013.01); *F16H 61/0213* (2013.01); *F16H 2059/0247* (2013.01); *F16H 2059/366* (2013.01); *F16H 2061/0244* (2013.01); *F16H 2061/161* (2013.01); *F16H 2061/166* (2013.01)

(58) Field of Classification Search
CPC ............... F16H 61/16; F16H 2061/161; F16H 2061/166; F16H 2061/0244; F16H 2059/366; F16H 2059/0247; F16H 2059/0243

See application file for complete search history.

(56) References Cited

U.S. PATENT DOCUMENTS

| | | | |
|---|---|---|---|
| 7,200,477 B2* | 4/2007 | Burzio | F16H 61/24 |
| | | | 701/52 |
| 7,845,457 B2 | 12/2010 | Baluch et al. | |
| 7,900,533 B2* | 3/2011 | Shiiba | F16H 61/16 |
| | | | 701/52 |
| 2012/0144947 A1 | 6/2012 | Herbert et al. | |

FOREIGN PATENT DOCUMENTS

| | | |
|---|---|---|
| CN | 101954862 A | 1/2011 |
| CN | 102019851 A | 4/2011 |
| CN | 102116368 A | 7/2011 |
| CN | 101595332 B | 7/2012 |
| JP | EP 0725237 A1 * | 8/1996 ......... F16H 61/0248 |

* cited by examiner

*Primary Examiner* — Erin D Bishop
(74) *Attorney, Agent, or Firm* — Quinn IP Law (57) ABSTRACT

A method of controlling an automatic transmission connected to an engine in a motor vehicle includes receiving an input signal generated via an application of force by a switch inside the vehicle. The switch has a predetermined travel and is configured to request a transmission speed-ratio change via an output signal indicative of the received input signal. The output signal is received via a controller programmed with a permitted engine speed range. The transmission is commanded to execute a change from a currently selected speed-ratio to another speed-ratio if the requested speed-ratio change would generate an engine speed within the permitted engine speed range. The switch is commanded to execute full travel under the application of force if the speed-ratio change in the transmission was commanded. Alternatively, the switch is commanded to execute partial travel under the application of force if the speed-ratio change in the transmission was not commanded.

20 Claims, 3 Drawing Sheets

MANUAL CONTROL OF SPEED-RATIO SELECTION IN AN AUTOMATIC TRANSMISSION

TECHNICAL FIELD

The disclosure relates to manual control of speed-ratio selection in an automatically-shiftable transmission for a motor vehicle.

BACKGROUND

Modern passenger vehicles frequently include a powertrain that includes an engine, a multi-speed automatically-shiftable or automatic transmission, and a differential or final drive. An automatic multi-speed transmission increases the overall operating range of the vehicle by permitting the engine to operate through its torque range multiple times without requiring an operator of the vehicle to manually select specific speed-ratios or gear ranges. The number of forward gear ranges or speed-ratios that are available in the transmission determines the number of times the engine torque range is repeated. An automatic transmission such as above may utilize an epicyclic or planetary gearing, or a parallel shaft mounted gear-train, such as in a Dual-Clutch transmission (DCT), for affecting specific transmission speed-ratios.

Modern automatic transmissions are typically controlled by an electronic controller, which may either be a dedicated transmission control unit (TCU) or powertrain control module (PCM) configured to control the entire powertrain, including the engine. The appropriate controller generally uses data provided by sensors from various vehicle systems to calculate how and when to change gears in the vehicle for optimum performance, fuel economy, and shift quality. Although such a controller is generally programmed to select the subject transmission's gear ratios automatically, frequently, modern automatic transmissions also offer to the vehicle operator the option of manual control over the selection of specific gear ratios.

SUMMARY

A method of controlling a multiple speed-ratio automatically-shiftable transmission operatively connected to an engine in a powertrain of a motor vehicle is disclosed. The method includes receiving an input signal via a switch arranged in the vehicle. The switch has a predetermined travel and is configured to request a speed-ratio change in the transmission. According to the method, the input signal to the switch is generated via an application of force. The method includes generating via the switch an output signal indicative of the received input signal and receiving the output signal via a controller programmed with a permitted engine speed range. The method also includes determining via the controller a currently selected speed-ratio in the transmission.

The method additionally includes commanding the transmission via the controller to execute a change from the currently selected speed-ratio to another speed-ratio if the change to the other speed-ratio would generate an engine speed within the permitted engine speed range. The method also includes commanding the switch via the controller to execute full predetermined travel in response to the application of force if the transmission was commanded to change from the currently selected speed-ratio to the other speed-ratio. Alternatively, the method includes commanding the switch to execute partial travel via the controller in response to the application of force if the transmission was not commanded to change from the currently selected speed-ratio to the other speed-ratio.

The act of commanding the switch to execute partial travel may signify that the request for the speed-ratio change has been denied. The method may additionally include generating via the controller a signal that the request for the speed-ratio change has been denied. The subject signal may trigger a tactile or haptic feedback at the switch, a visual display, and/or an audible chime.

According to the method, the switch may be configured to request an upshift in the transmission. Furthermore, the permitted engine speed range may include a minimum permitted engine speed. The act of commanding the transmission to execute the change from the currently selected speed-ratio to the other speed-ratio may, therefore, command the upshift.

In a different embodiment, the switch may be configured to request a downshift in the transmission. The permitted engine speed range may include a maximum permitted engine speed. The act of commanding the transmission to execute the change from the currently selected speed-ratio to the other speed-ratio may then command the downshift.

The method may also include receiving via the switch consecutive input signals and determining or identifying via the controller a time span between the consecutive input signals. The method may additionally include determining via the controller whether the time span between consecutive input signals is below a threshold time span. Furthermore, the method may include commanding the transmission via the controller to shorten an amount of time required to execute the change from the currently selected speed-ratio to the other speed-ratio when the time span between consecutive input signals is below the threshold time span.

The vehicle may additionally include a sensor configured to detect a magnitude of the force and the output signal may be additionally indicative of the magnitude of the force. The method may then also include determining via the controller whether the magnitude of the force is greater than a threshold force. Furthermore, the method may then include commanding the transmission via the controller to shorten the amount of time required to execute the change from the currently selected speed-ratio to the other speed-ratio when the magnitude of the force is greater than the threshold force.

If the application of force for the input signal is maintained following the command for the switch to execute partial travel, the method may also include maintaining via the controller the request for the speed-ratio change in the transmission. Additionally, in such a case, the method may include commanding the transmission via the controller to execute the change from the currently selected speed-ratio to the other speed-ratio when the change to the other speed-ratio would generate an engine speed within the permitted engine speed range. Furthermore, the method may include canceling via the controller the request for the speed-ratio change in the transmission if the application of force for the input signal is not maintained following the command for the switch to execute partial travel.

On the other hand, if the application of force for the input signal is maintained following the command for the switch to execute partial travel, the method may include canceling via the controller the request for the speed-ratio change in the transmission if the change to the other speed-ratio would not generate an engine speed within the permitted engine speed range, within a predetermined timeframe, i.e., if it is determined that the other speed-ratio will not become available.

According to the method, the predetermined timeframe for the application of force during the input signal may be in the range of 1000-3000 milliseconds.

The vehicle may include a steering column and a steering wheel rotatably mounted on the steering column. Furthermore, the switch may be arranged on one of the steering wheel and the steering column, and configured as one or more shift paddles.

A system for controlling a multiple speed-ratio range automatically-shiftable transmission operatively connected to an engine in a powertrain of a motor vehicle and having the controller programmed to execute the above disclosed method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
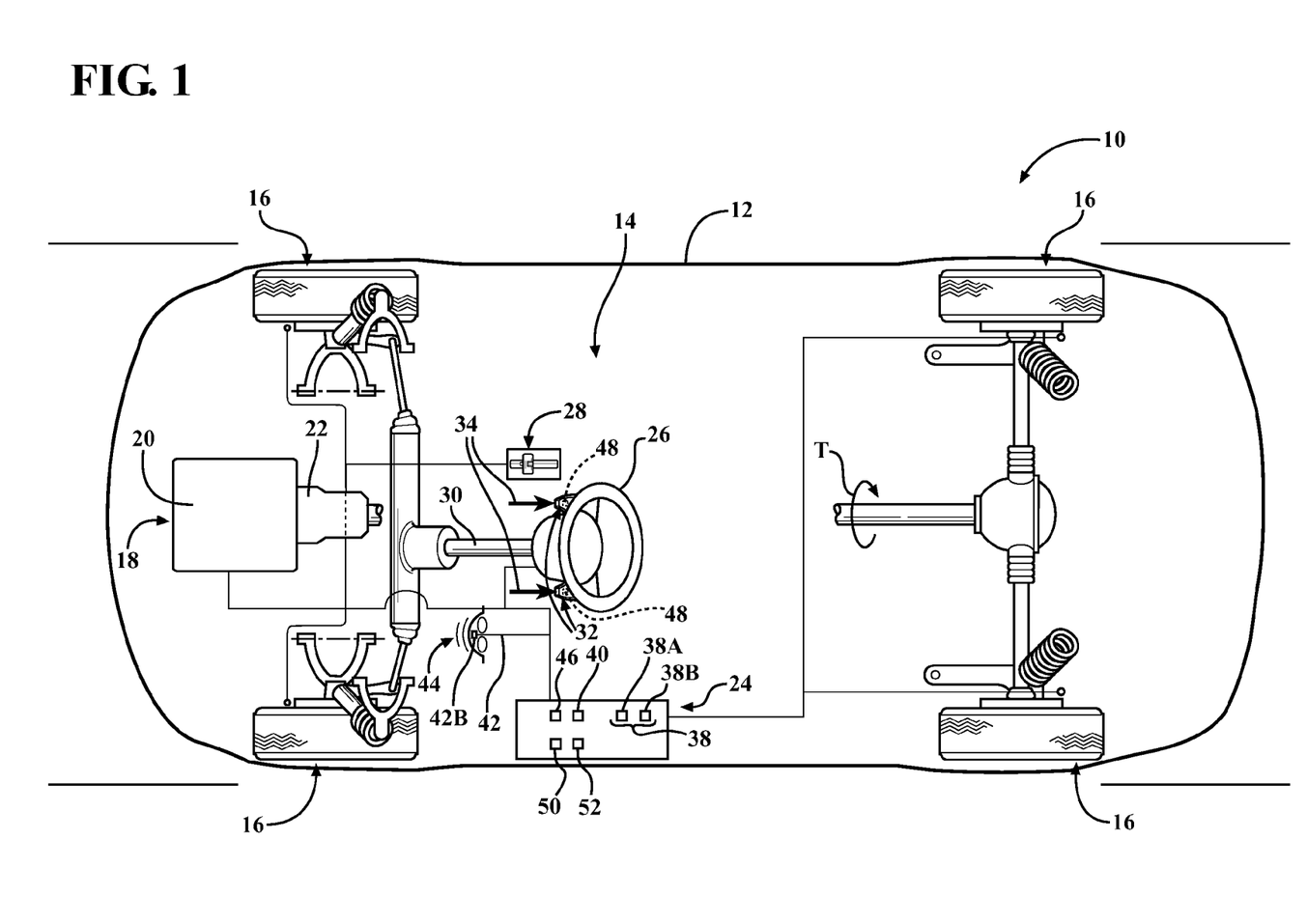
FIG. 1 is a schematic illustration of a vehicle employing a powertrain that includes an internal combustion engine connected to an automatic transmission and vehicle interior mounted shift paddles that provide a transmission control interface for an operator.

Referring to the drawings, wherein like reference numbers refer to like components, FIG. 1 illustrates a vehicle 10 that includes a vehicle body 12 that defines a vehicle interior or passenger compartment 14. The vehicle 10 also includes a plurality of road wheels 16 and a powertrain 18 configured to launch and propel a vehicle, i.e., operate the vehicle in all speed-ratio ranges between low and high road speeds.

The powertrain 18 includes an internal combustion engine 20 for generating engine torque T and may also include a variety of additional power sources, such as one or more electric motor/generators (not shown). The powertrain 18 also includes a multiple speed-ratio automatically-shiftable, a.k.a., automatic, transmission 22 operatively connecting the engine 20 to at least some of the wheels 16 for transmitting engine torque thereto. The vehicle 10 also includes an electronic control unit (ECU) or controller 24. The controller 24 is operatively connected to the powertrain 18 in order to control and coordinate operation of the engine 20 and the transmission 22. Each of the engine 20 and transmission 22 may also be separately controlled by a respective engine controller and a transmission control unit, which would also be programmed to communicate with each other to affect overall control of the powertrain 18. However, for simplicity, the present disclosure will be limited to describing control of the powertrain 18 via the controller 24.

Arranged inside the passenger compartment or vehicle interior 14 are a variety of mechanical, electrical, and electro-mechanical devices configured to control operation of the vehicle and its various subsystems. As shown in FIG. 1, such devices include a steering wheel 26 and a transmission shift selector 28 for controlling operation of the transmission 22. As known by those skilled in the art, the steering wheel 26 is typically rotatably mounted in the vehicle 10 on a steering column 30 and is configured to turn at least some of the wheels 16. As similarly known by those skilled in the art, the transmission shift selector 28, which may be a mechanical control lever or electro-mechanical switch, is configured, i.e., designed and constructed, to be manipulated by an operator of the vehicle 10 for selecting among operating modes, speed-ratio ranges, and/or specific speed-ratios of the transmission 22. Specific operating modes of the transmission 22 may include a forward or drive mode in which engine torque can be employed to move the vehicle 10 in one direction, a reverse mode in which engine torque can be employed to move the vehicle in a direction that is opposite to that of the drive mode, and a neutral mode in which no engine torque can be transmitted to the wheel(s) 16. The transmission 22 also includes a park mode in which the transmission blocks vehicle movement.

Typically, automatic transmissions, such as the transmission 22, include a gear-train that has input and output members or shafts and a number of gear elements, generally in the nature of one or more planetary gear sets, for coupling the input and output shafts. Traditionally, a related number of hydraulically actuated torque transmitting devices, such as clutches and brakes, are selectively engageable to activate the aforementioned gear elements for establishing desired forward and reverse speed ratios between the transmission's input and output shafts. The speed ratio is defined as the transmission input speed divided by the transmission output speed. The transmission input shaft is generally selectively connectable to the vehicle engine (e.g., through a fluid coupling device such as a torque converter), whereas the output shaft is connected through a "drive train" directly to the vehicle wheels.

Shifting from one speed ratio to another is typically performed in response to engine throttle and vehicle speed, and generally involves releasing one or more "off-going" clutches associated with the current or attained speed ratio, and applying one or more "on-coming" clutches associated with the desired or commanded speed ratio. To perform a "downshift", the transmission transitions from a low speed ratio to a high speed ratio. The downshift is accomplished by disengaging a clutch associated with the lower speed ratio, and contemporaneously engaging a clutch associated with the higher speed ratio, thereby reconfiguring the gear set to operate at the higher speed ratio. The selection of speed-ratios in the transmission 22 permits effective use of engine torque and extends operation of the engine 20 over a wide range of vehicle speeds. Typically, the controller 24 uses signals from various sensors connected to the engine 20, the transmission 22, and other vehicle systems, to determine when and how to shift between speed-ratios in the transmission.

The transmission 22 may include a number of specific speed-ratios in the drive mode. Such speed-ratios generally include a highest or first speed-ratio that provides the greatest multiplication of engine torque to effectively launch the vehicle 10 forward from a full stop. The highest speed-ratio is generally significantly greater than 1:1, and is typically greater than 3:1 in modern automatic transmissions. Other speed-ratios in the transmission 22 may be intermediate speed-ratio(s) that permit efficient use of available engine torque to propel the vehicle 10 in the drive mode at various road speeds. Such intermediate speed-ratio(s) may range from significantly greater than and up to 1:1. The transmission 22 may also include a lowest or top speed-ratio that reduces speed of the engine 20 to minimize engine noise and fuel consumption while employing sufficient engine torque to maintain vehicle forward progress at cruising speeds. Such a highest speed-ratio is frequently lower than 1:1.

Available speed-ratios may also include a high speed-ratio, greater than 1:1, in the reverse mode that multiplies engine torque to effectively launch and move the vehicle 10 in reverse. To facilitate control of the transmission 22, the transmission shift selector 28 may include specific positions corresponding to the above-described operating modes, speed-ratio ranges, and/or individual speed-ratios, all of which may be defined by tactile detents, for selection by the operator of the vehicle 10. In other words, the transmission shift selector 28 may include predetermined positions that specifically select all the available speed-ratios in drive mode, all the speed-ratios in reverse mode, or neutral. The vehicle 10 also includes a switch 32 that is arranged inside the vehicle passenger compartment 14. As may be seen in a close-up view of FIG. 2, the switch 32 may be configured as a pair of shift paddles 32A and 32B. Each shift paddle 32A and 32B has a predetermined travel $T_f$ (shown in FIG. 3) in response to an application of force F, thus providing a control interface between an operator of the vehicle 10 and the transmission 22. Alternatively, although not shown, the switch 32 may also be configured as an actuating device on or near the transmission shift selector 28.

Figure 2:
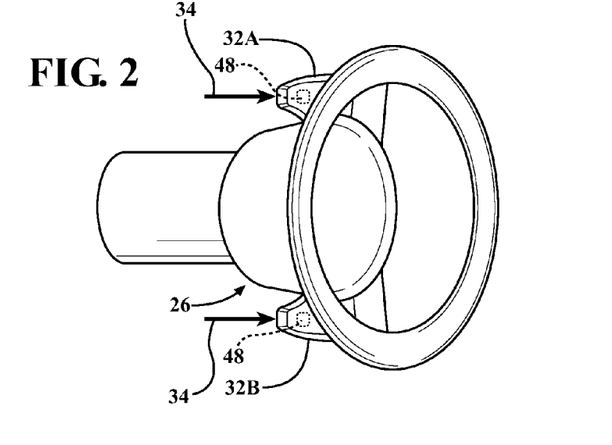
FIG. 2 is a schematic close-up illustration of the vehicle interior, as shown in FIG. 1, having a steering wheel with the shift paddles mounted relative thereto.

Each shift paddle 32A, 32B is configured to request a speed-ratio change in the transmission 22 in response to receiving an input signal 34 via the application of force F and generating an output signal indicative of the input signal to the controller 24. As shown, the shift paddle 32A is arranged on the right hand side of the steering wheel 26 and configured to request an upshift, while the shift paddle 32B is arranged on the left hand side of the steering wheel 26 and configured to request a downshift. However, the above-described arrangement may be reversed, such that shift paddle 32A is arranged on the left hand side of the steering wheel 26 and the shift paddle 32B is arranged on the right hand side. Furthermore, the shift paddles 32A, 32B may be arranged either directly on the steering wheel 26 or behind the steering wheel on the steering column 30, such that the shift paddles are within reach of the fingers of the vehicle operator while the operator's hands are positioned on the steering wheel. The shift paddles 32A, 32B are intended to provide the operator with the capability to control speed-ratio selection in the transmission 22 via manual input instead of relying on automatically-performed speed-ratio changes.

The controller 24 provides operative communication between the switch 32 and the transmission 22. The controller 24 is also programmed with a permitted engine speed range 38, which includes a minimum permitted engine speed 38A and a maximum permitted engine speed 38B. As understood by those skilled in the art, an unacceptably low engine speed may result in the engine 20 experiencing a stall event, while an unacceptably high engine speed may result in structural damage of the engine. Accordingly, the minimum permitted engine speed 38A is typically an engine speed below which the engine 20 either makes insufficient torque to power the vehicle 10, may stall, or generates undesirable NVH, a.k.a., noise vibration, and/or harshness. On the other hand, the maximum permitted engine speed 38B is typically an engine speed above which the engine 20 either experiences a significant drop-off in output torque or becomes structurally limited.

The controller 24 is additionally configured to receive the output signal from either the shift paddle 32A or the shift paddle 32B. The controller 24 is also configured to determine or identify a currently selected speed-ratio 40 in the transmission 22. The controller 24 is also configured to command the transmission 22 to execute a change from the currently selected speed-ratio 40 to another speed-ratio if the change to the other speed-ratio would generate an engine speed within the permitted engine speed range 38, i.e., between the minimum and maximum permitted engine speeds 38A, 38B. Accordingly, the command to the transmission 22 to execute the change from the currently selected speed-ratio 40 to the other speed-ratio in response to input signal 34 at the shift paddle 32A commands an upshift. Conversely, the command to the transmission 22 to execute the change from the currently selected speed-ratio 40 to the other speed-ratio in response to input signal 34 at the shift paddle 32B commands a downshift.

Figure 3:
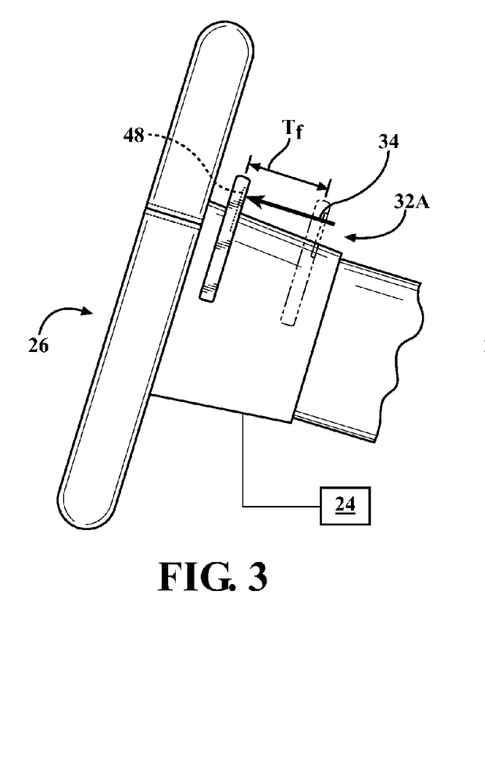
FIG. 3 is a schematic close-up side illustration of the vehicle interior shown in FIG. 1 with one of the shift paddles illustrated in full travel position.
Figure 4:
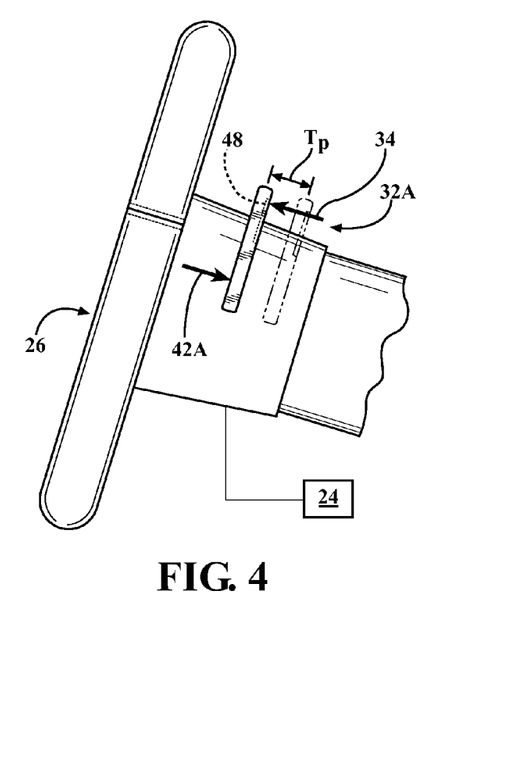
FIG. 4 is another schematic close-up side illustration of the vehicle interior shown in FIG. 1 with one of the shift paddles illustrated in partial travel position.

Additionally, the controller 24 is configured to command the switch to execute, i.e., provide, full predetermined travel $T_f$ in response to the application of force F if the transmission 20 was commanded to change from the currently selected speed-ratio 40 to the other speed-ratio. In other words, the command and execution of full predetermined travel $T_f$ of the shift paddles 32A, 32B signifies that the operator's request for the speed-ratio change has been accepted. Furthermore, the controller 24 is configured to command the shift paddles 32A, 32B to execute partial travel $T_p$ (shown in FIG. 4) in response to the application of force F if the transmission 20 was not commanded to change from the currently selected speed-ratio 40 to the other speed-ratio. In other words, the command and execution of partial travel $T_p$ of the shift paddles 32A, 32B signifies that the operator's request for the speed-ratio change has been denied. Partial travel $T_p$ of the shift paddles 32A, 32B may be in the range of 40-60% of full travel $T_f$, or some other range of travel that permits the operator to readily discern the difference between partial travel $T_p$, and full travel $T_f$. FIG. 4 illustrates the shift paddle 32A in partial travel $T_p$ position, while FIG. 3 illustrates the shift paddle 32A in full predetermined travel $T_f$ position. The controller 24 may also be configured to generate a signal 42 to indicate that the operator's request for the speed-ratio change, either an upshift or a downshift, has been denied. The signal 42 may trigger a tactile or haptic feedback 42A at the switch 32, such as via a pushback or pulsation in response to the operator input at the shift paddles 32A, 32B (shown in FIG. 4). Such a tactile feedback 42A may, for example, be effected by an individual force solenoid (not shown) arranged at each of the shift paddles 32A, 32B. The signal 42 may also trigger a visual display or an indicator light 42B on an instrument panel 44 of the vehicle 10 (shown in FIG. 1). Additionally, the signal 42 may trigger an audible chime intended to either supplement or take place of the visual display and/or the tactile feedback.

In the event the either the shift paddle 32A or the shift paddle 32B receives consecutive discrete input signals 34 the controller 24 may also be configured to determine a time span between the consecutive input signals. Additionally, the controller 24 may determine whether the determined time span between such consecutive input signals 34 is below a threshold time span 46, wherein the threshold time span is programmed in the controller. To perform the noted determination of the time span between the consecutive input signals 34, the controller 24 includes an internal clock or timer (not shown). The threshold time span 46 may be identified as a predetermined amount of time during which the vehicle operator may select a "skip-shift" in the transmission 22. A "skip-shift" is a general term used to describe a speed-ratio change that selects a target speed-ratio directly from the current speed-ratio and omits selection of each consecutive speed-ratio in between. Such a "skip-shift" may for example result in a downshift from an eighth speed-ratio directly to a fifth speed-ratio in order to provide maximum torque output from the powertrain 18 as permitted by the maximum permitted engine speed 38B, without the transmission 22 physically selecting the seventh and sixth speed-ratios prior to selecting the fifth. During such a "skip-shift" request, the controller 24 may additionally command the transmission 22 to shorten an amount of time required to execute the change from the currently selected speed-ratio to the other, requested speed-ratio when the time span between consecutive input signals is below the threshold time span 46, thereby improving or shortening vehicle response time. Accordingly, commanding the transmission 22 to shorten an amount of time required to execute the speed-ratio change when the time span between consecutive input signals 34 is below the threshold time span 46 may include commanding a "skip-shift".

As shown in FIG. 2, the vehicle 10 may include sensors 48 in communication with the controller 24, wherein at least one such sensor is positioned at each of the shift paddles 32A, 32B to detect the respective input signals 34. The sensors 48 may also be configured to detect a magnitude of the force F of the respective input signals 34 at the shift paddles 32A, 32B and communicate the output signal to the controller 24 indicative of the magnitude of the force F. Furthermore, the controller 24 may be additionally configured to determine whether the magnitude of the force F is greater than a threshold force 50 and command the transmission 22 to shorten the amount of time required to execute the change from the currently selected speed-ratio to the other, requested speed-ratio when the magnitude of the force F is greater than the threshold force 50.

The controller 24 may be further configured to maintain the request for the speed-ratio change in the transmission 22 if the application of force F for the input signal 34 is maintained by the operator after the controller 24 has commanded the particular shift paddle 32A, 32B to execute partial travel $T_p$. Additionally, the controller 24 may be configured to maintain the request for the speed-ratio change in the transmission 22 and command the transmission to execute the change from the currently selected speed-ratio 40 to the other speed-ratio when the change to the other speed-ratio would generate a speed of the engine 20 within the permitted engine speed range 38. Accordingly, in such a case, if the operator keeps applying the force F at the partially actuated respective shift paddle 32A, 32B, the controller 24 will select the requested speed-ratio as soon as such can be executed safely.

The controller 24 may also be configured to cancel the request for the speed-ratio change in the transmission 22 if the other, requested speed-ratio does not become available. According to the present disclosure, the requested speed-ratio becomes available when the change to the other speed-ratio would generate an engine speed within the permitted engine speed range 38 and within a predetermined timeframe 52. Therefore, the maintained request for the speed-ratio change in the transmission 22 maybe canceled if the controller 24 determines that the requested speed-ratio change would not generate an engine speed that is within the permitted engine speed range 38 within the predetermined timeframe 52. The predetermined timeframe 52 for the application of force F of the input signal 34 may be set in the range of 1000-3000 milliseconds, after which the operator's request is considered to be timed-out and a new input signal 34 would be required to send the output signal to the controller 24 to affect a speed-ratio change. Following the predetermined timeframe 52 having elapsed at the executed partial travel $T_p$ of the switch 32, the previously described tactile feedback 42A may be triggered via the controller 24, to thereby notify the operator that the request for the speed-ratio change has been canceled. Furthermore, the controller 24 may be configured to cancel the request for the speed-ratio change in the transmission 22 following the command for either the shift paddle 32A or 32B to execute partial travel $T_p$ if the application of force F for the input signal 34 is not maintained, i.e., when the particular shift paddle is released.

Figure 5:
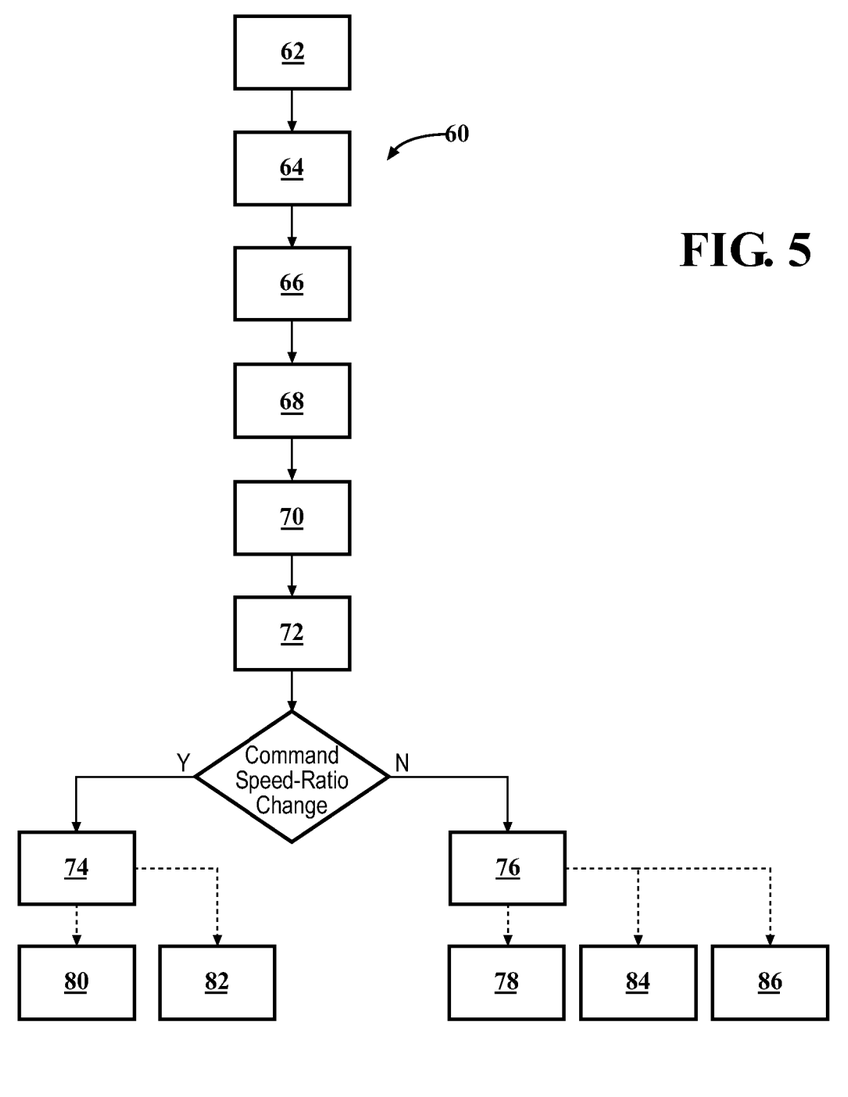
FIG. 5 is a flow diagram of a method of controlling the multiple speed-ratio automatically-shiftable transmission shown in FIG. 1 using the shift paddles shown in FIGS. 2-4.

FIG. 5 depicts a method 60 of controlling the automatic transmission 22 in the powertrain 18 of the vehicle 10, as described above with respect to FIGS. 1-4. The method 60 is initiated in frame 62 with the vehicle 10 being motivated by torque of the engine 20. Following frame 62, the method 60 proceeds to frame 64, where it includes receiving the input signal 34 via the switch 32, such as the shift paddle 32A or 32B, actuated via the application of force F. After frame 64, the method advances to frame 66. In frame 66 the method includes generating the output signal via one of the shift paddles 32A, 32B. From frame 66 the method proceeds to frame 68. In frame 68 the method includes receiving the output signal via the controller 24. After frame 68 the method advances to frame 70 for determining via the controller 24 the currently selected speed-ratio 40 in the transmission 22. Following frame 70, the method proceeds to frame 72.

In frame 72, the method includes commanding the transmission 22 via the controller 24 to execute a change from the currently selected speed-ratio 40 to another speed-ratio if the change to the other speed-ratio would generate an engine speed within the permitted engine speed range 38. After frame 72 the method advances to frame 74. In frame 74 the method includes commanding the respective actuated shift paddle 32A or 32B via the controller 24 to execute full predetermined travel $T_f$ in response to the application of force F if the transmission 22 was commanded to change from the currently selected speed-ratio 40 to the other speed-ratio. As described above with respect to FIG. 3, the respective shift paddle 32A or 32B achieving the full predetermined travel $T_f$ signifies that the request for the speed-ratio change has been accepted.

Alternatively, following frame 72 the method proceeds to frame 76. In frame 76 the method includes commanding the switch 32, i.e., respective actuated shift paddle 32A or 32B shown in FIGS. 1-4, via the controller 24 to execute partial travel $T_p$ in response to the application of force F if the transmission 22 was not commanded to change from the currently selected speed-ratio to the other speed-ratio. As described above with respect to FIG. 4, the respective shift paddle 32A or 32B achieving partial travel $T_p$ signifies that the request for the speed-ratio change has been denied. Following frame 76, the method may advance to frame 78, where the method includes generating, via the controller 24, the signal 42 intended to communicate to the operator that the request for the speed-ratio change has been denied.

Following frame 74, the method may also advance to frame 80, where the method includes receiving via the switch 32 consecutive input signals 34 and determining or identifying via the controller 24 a time span between the consecutive input signals. In frame 80 the method also includes determining via the controller 24 whether the time span between consecutive input signals 34 is below the threshold time span 46 that is programmed into the controller 24. Furthermore, in frame 80 the method includes commanding the transmission 22 via the controller 24 to shorten an amount of time required to execute the change from the currently selected speed-ratio to the other speed-ratio when the time span between consecutive input signals is below the threshold time span 46.

Following frame 74, the method may also advance to frame 82, where the method includes determining via the controller 24 whether the magnitude of the force F is greater than a threshold force 50. In frame 82 the method also includes commanding the transmission 22 via the controller 24 to shorten the amount of time required to execute the change from the currently selected speed-ratio 40 to the other speed-ratio when the magnitude of the force F is greater than the threshold force 50.

Following frame 76, the method may also advance to frame 84, where the method includes maintaining via the controller 24 the request for the speed-ratio change in the transmission 22. In frame 82 the method also includes commanding the transmission 22 via the controller 24 to execute the change from the currently selected speed-ratio 40 to the other speed-ratio when the change to the other speed-ratio would generate an engine speed within the permitted engine speed range 38. Furthermore, in frame 84 the method includes canceling via the controller 22 the request for the speed-ratio change in the transmission 22 if the application of force F for the input signal 34 is not maintained following the command for the actuated shift paddle 32A or 32B to execute partial travel $T_p$.

Following frame 76, the method may also advance to frame 86, where the method includes canceling via the controller 24 the request for the speed-ratio change in the transmission 22 if the other, requested speed-ratio does not become available within the predetermined timeframe 52. As described above with respect to FIGS. 1-4, the requested speed-ratio becomes available when the change to the other speed-ratio would generate an engine speed within the permitted engine speed range 38. Following any of the frames 74-86 the method may loop back to frame 64.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling a multiple speed-ratio automatically-shiftable transmission operatively connected to an engine in a powertrain of a motor vehicle, the method comprising:
    receiving an input signal via a switch arranged in the vehicle, having a predetermined travel, and configured to request a speed-ratio change in the transmission, wherein the input signal is generated via an application of force to the switch;
    generating via the switch an output signal indicative of the received input signal;
    receiving the output signal via a controller programmed with a permitted engine speed range;
    determining via the controller a currently selected speed-ratio in the transmission;
    commanding the transmission via the controller to execute a change from the currently selected speed-ratio to another speed-ratio if the change to the other speed-ratio would generate an engine speed within the permitted engine speed range;
    commanding the switch via the controller to execute full predetermined travel in response to the application of force if the transmission was commanded to change from the currently selected speed-ratio to the other speed-ratio; and
    commanding the switch via the controller to execute partial travel in response to the application of force if the transmission was not commanded to change from the currently selected speed-ratio to the other speed-ratio.

2. The method of claim 1, wherein said commanding the switch to execute partial travel signifies that the request for the speed-ratio change has been denied, further comprising generating via the controller a signal that the request for the speed-ratio change has been denied.

3. The method of claim 1, wherein:
    the switch is configured to request an upshift in the transmission;
    the permitted engine speed range includes a minimum permitted engine speed; and
    said commanding the transmission to execute the change from the currently selected speed-ratio to the other speed-ratio includes commanding the upshift.

4. The method of claim 1, wherein:
    the switch is configured to request a downshift in the transmission;
    the permitted engine speed range includes a maximum permitted engine speed; and
    said commanding the transmission to execute the change from the currently selected speed-ratio to the other speed-ratio includes commanding the downshift.

5. The method of claim 1, further comprising:
    receiving consecutive input signals via the switch;
    determining via the controller a time span between the consecutive input signals;
    determining via the controller whether the time span between consecutive input signals is below a threshold time span; and
    commanding the transmission via the controller to shorten an amount of time required to execute the change from the currently selected speed-ratio to the other speed-ratio when the time span between consecutive input signals is below the threshold time span.

6. The method of claim 1 wherein the vehicle additionally includes a sensor configured to detect a magnitude of the force and the output signal is additionally indicative of the magnitude of the force, further comprising:
determining via the controller whether the magnitude of the force is greater than a threshold force; and
commanding the transmission via the controller to shorten an amount of time required to execute the change from the currently selected speed-ratio to the other speed-ratio when the magnitude of the force is greater than the threshold force.

7. The method of claim 1, wherein the application of force for the input signal is maintained following the command for the switch to execute partial travel, further comprising:
maintaining via the controller the request for the speed-ratio change in the transmission;
commanding the transmission via the controller to execute the change from the currently selected speed-ratio to the other speed-ratio when the change to the other speed-ratio would generate an engine speed within the permitted engine speed range; and
canceling via the controller the request for the speed-ratio change in the transmission if the application of force for the input signal is not maintained following the command for the switch to execute partial travel.

8. The method of claim 7, wherein the application of force for the input signal is maintained following the command for the switch to execute partial travel, further comprising canceling via the controller the request for the speed-ratio change in the transmission if the change to the other speed-ratio would not generate an engine speed within the permitted engine speed range, within a predetermined timeframe.

9. The method of claim 8, wherein the predetermined timeframe for the application of force is in the range of 1000-3000 milliseconds.

10. The method of claim 1, wherein the vehicle includes a steering column and a steering wheel rotatably mounted on the steering column, and wherein said receiving the input signal and generating the output signal is via the switch arranged on one of the steering wheel and the steering column and configured as a shift paddle.

11. A system for controlling a multiple speed-ratio automatically-shiftable transmission operatively connected to an engine in a powertrain of a motor vehicle, the system comprising:
a switch arranged in the vehicle, having a predetermined travel, and configured to request a speed-ratio change in the transmission in response to receiving an input signal via an application of force to the switch and generating an output signal indicative of the received input signal; and
a controller in operative communication with each of the switch and the transmission, programmed with a permitted engine speed range, and configured to:
receive the output signal;
determine a currently selected speed-ratio in the transmission;
command the transmission to execute a change from the currently selected speed-ratio to another speed-ratio if the change to the other speed-ratio would generate an engine speed within the permitted engine speed range;
command the switch to execute full predetermined travel in response to the application of force if the transmission was commanded to change from the currently selected speed-ratio to the other speed-ratio; and
command the switch to execute partial travel in response to the application of force if the transmission was not commanded to change from the currently selected speed-ratio to the other speed-ratio.

12. The system of claim 11, wherein:
the command to the switch to execute partial travel signifies that the request for the speed-ratio change has been denied; and
the controller is additionally configured to generate a signal that the request for the speed-ratio change has been denied.

13. The system of claim 11, wherein:
the switch is configured to request an upshift in the transmission;
the permitted engine speed range includes a minimum permitted engine speed; and
the command to the transmission to execute the change from the currently selected speed-ratio to the other speed-ratio commands the upshift.

14. The system of claim 11, wherein:
the switch is configured to request a downshift in the transmission;
the permitted engine speed range includes a maximum permitted engine speed; and
the command to the transmission to execute the change from the currently selected speed-ratio to the other speed-ratio commands the downshift.

15. The system of claim 11, wherein when the switch receives consecutive input signals, the controller is further configured to:
determine a time span between the consecutive input signals;
determine whether the time span between consecutive input signals is below a threshold time span; and
command the transmission to shorten an amount of time required to execute the change from the currently selected speed-ratio to the other speed-ratio when the time span between consecutive input signals is below the threshold time span.

16. The system of claim 11, further comprising a sensor configured to detect a magnitude of the force and the output signal is additionally indicative of the magnitude of the force, wherein the controller is additionally configured to:
determine whether the magnitude of the force is greater than a threshold force; and
command the transmission to shorten an amount of time required to execute the change from the currently selected speed-ratio to the other speed-ratio when the magnitude of the force is greater than the threshold force.

17. The system of claim 11, wherein the application of force for the input signal is maintained following the command for the switch to execute partial travel, the controller is further configured to:
maintain the request for the speed-ratio change in the transmission and command the transmission to execute the change from the currently selected speed-ratio to the other speed-ratio when the change to the other speed-ratio would generate an engine speed within the permitted engine speed range; and
cancel the request for the speed-ratio change in the transmission if the application of force for the input signal is not maintained following the command for the switch to execute partial travel.

18. The system of claim 17, wherein the application of force for the input signal is maintained following the command for the switch to execute partial travel, the controller is configured to cancel the request for the speed-ratio change in the transmission if the change to the other speed-ratio would not generate an engine speed within the permitted engine speed range, within a predetermined timeframe.

19. The system of claim 18, wherein the predetermined timeframe for the application of force is in the range of 1000-3000 milliseconds.

20. The system of claim 11, wherein the vehicle includes a steering column and a steering wheel rotatably mounted on the steering column, and wherein the switch is a shift paddle arranged on one of the steering wheel and the steering column.

* * * * *